June 7, 1932. J. R. OISHEI 1,862,094
ALL METAL REAR VIEW MIRROR
Filed Feb. 7, 1929
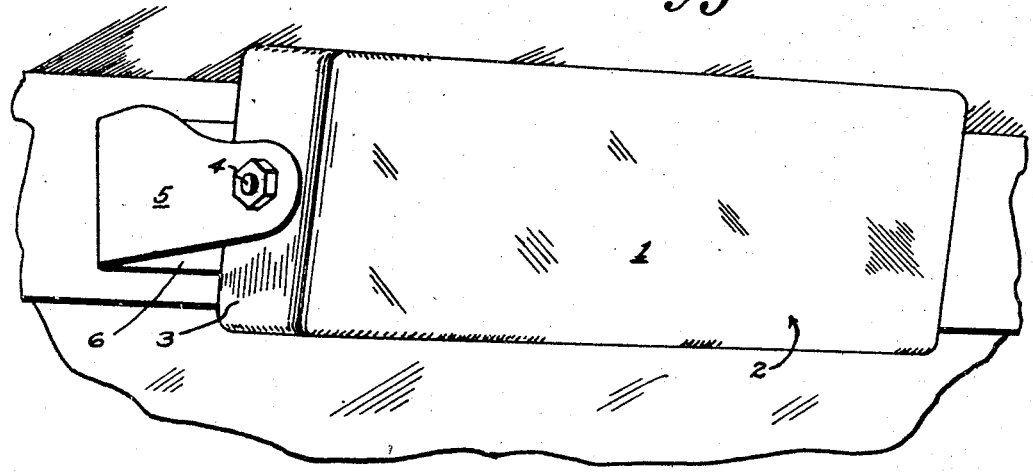
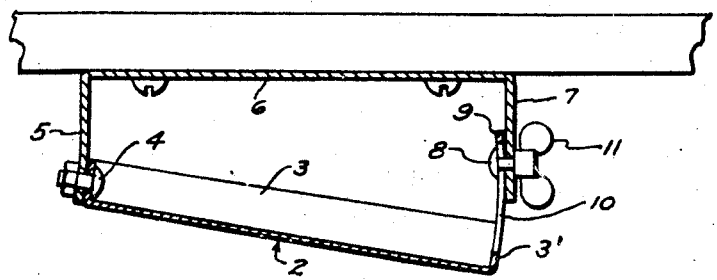
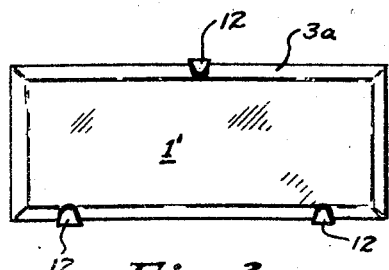
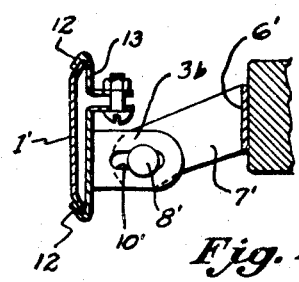
Inventor
John R. Oishei
by Barton A. Beau Jr
Attorney Patented June 7, 1932

1,862,094

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

ALL-METAL REAR VIEW MIRROR

Application filed February 7, 1929. Serial No. 338,262.

This invention relates to a rear view mirror for motor vehicles by which the traffic conditions to the rear of the vehicle may be ascertained.

Heretofore, automobile mirrors have been constructed of transparent glass coated on the rear face with a reflecting layer, but, in addition to such mirrors accidentally cracking or breaking very readily, they are also objectionable in that they cast a dual reflection of the images. This is due primarily to the fact that the front and rear surfaces of the glass body are not in exact parallelism and consequently the headlights from an overtaking vehicle, when reflected, create the impression of four headlights rather than two, the front surface of the glass casting one reflection while the coated rear surface of the glass reflects the brighter image. This dual reflection is somewhat magnified and accentuated by reason of the vibration set up in the motor vehicle incidental to the normal operation of the same, so that in addition to a double reflection, the vibration has a tendency to blur this reflection whereby the operator of the automobile obtains an approximation only of the traffic conditions and is frequently more or less confused as to just what the true conditions are to the rear, especially when he is called upon to momentarily glance into the rear view mirror as when in heavy traffic.

In overcoming these disadvantages, the present invention has for its objects to provide a mirror with its active or main reflective surface disposed on the front face of the mirror body; to provide an all-metal rear view mirror, for motor vehicles, having a hard and highly efficient reflective surface; and to provide an all-metal mirror which may be securely and firmly clamped in position to withstand the objectional vibration so frequently found in the mounting of glass rear view mirrors.

The invention further resides in the salient features of construction hereinafter more clearly defined, reference being had to the accompanying drawing wherein, Fig. 1 is a perspective view of an all-metal rear view mirror constructed in accordance with the present invention.

Fig. 2 is a horizontal section therethrough.

Fig. 3 is a front elevation of a slightly modified embodiment of the invention.

Fig. 4 is a vertical sectional view therethrough.

In proceeding in accordance with the present invention, the numeral 1 designates the reflector body preferably shaped out of sheet metal or other non-transparent material and having its front face highly polished to constitute a reflective surface 2. This reflective surface is improved and rendered permanent by coating such front face with a reflective substance or material, as chromium plating the metal body whereby a mirror possessing a hard and highly reflective surface is obtained. To accord rigidness to the body 1, and also to provide means for attachment or mounting, the body is provided with marginal flanges 3 skirting the edges of the body 1 and extending rearwardly therefrom.

The reflector body is preferably of rectangular shape, and a simple manner of mounting the same is illustrated in Figs. 1 and 2 wherein one end flange 3 is provided with an aperture to receive a pivot bolt 4 for connecting the same to an arm 5 of the attaching bracket 6. This bracket is also provided with a second arm 7 through which a bolt 8 is passed for supporting the opposite end of the reflector body 1. The end flange 3' at said opposite end of the body is extended in the form of an elongated ear 9 longitudinally slotted at 10, to adjustably receive the bolt 8 in adjustments of the reflector body. This construction permits of the ear being slid on the bolt 8 to obtain the desired angular adjustment about a perpendicular axis in the proximity of pivot bolt 4, and when the desired adjustment has been effected the winged nut 11 is tightened to firmly clamp the ear 9 against the arm 7.

In the modified showing of Figs. 3 and 4 a different attaching bracket is provided for mounting the reflector body 1'. This reflector body is shaped so that its flanges 3a extend rearwardly at an obtuse angle to simulate the appearance of a beveled glass mirror, and over the bevel-forming flanges 3a the clamping fingers 12 of a holder plate 13 engage to firmly secure the reflector body 1'. This holder plate may be equipped with an elongated ear 3b having a slot 10' therein to permit of the desired angular adjustment of the reflector body on the bracket 6', in a manner similar to that disclosed in Fig. 2, the clamping bolt 8' firmly securing the ear 3b against the arm 7'.

The advantages of this all-metal rear view mirror are many. The article is not subject to accidental breakage as glass mirrors are and is capable of being more firmly secured without danger of accidental breakage. Its metal flanges permit firmer attachment against excessive vibration which is so frequently set up in a motor vehicle during its normal operation, and by reason of its single reflective surface, with that disposed on the front face of the mirror body, the possibility of a dual reflection is avoided.

By constructing the reflector body of metal it is also possible to connect the attaching bracket directly to the reflector body, the latter being more or less of a hollow formation, or hollowed back by reason of the attaching flanges 3 and 3a. These marginal flanges add a neat appearance to the mirror besides giving the body an apparent thickness or depth substantial in character. They further provide an attaching means whereby the bracket may be directly attached thereto without the intermediary of other clamps such as are found in the mounting of glass mirrors.

What is claimed is:

1. A rear view mirror comprising a reflector body having integral marginal flanges directed rearwardly, the forward face of the body being provided with a reflective surface and constituting the reflective surface thereof, and means engaging with the marginal flanges only and otherwise spaced from the body for mounting said reflector body, said means engaging flanges disposed at opposite edges of the reflective surface.

2. An all-metal rear view mirror comprising a reflector body struck up from sheet metal and having its front face polished to constitute a reflective surface, the marginal portions of said body being deflected rearwardly to constitute a peripheral flange, and means engaging said flange for mounting the reflector body on an automobile.

3. An all-metal rear view mirror comprising a reflector body formed of metal and having its front face coated with a chromium plate to constitute a reflective surface, the marginal portions of said body being deflected rearwardly to constitute attaching flanges, and means engaging the flanges and mounting the reflector body for angular adjustment.

4. An all-metal rear view mirror comprising a sheet metal body having its front face coated with a reflective material to constitute a reflector surface, and its marginal portions deflected rearwardly to create the appearance of substantial depth for the reflector body, and mounting means engaging the marginal portions.

5. A rear view all-metal mirror for motor vehicles, comprising a body having marginal, depth-appearing flanges extending angularly therefrom, the front face of the body and the contiguous flange-faces being provided with reflective surfaces.

6. A rear view mirror comprising a reflector body formed of non-transparent material and having its front face polished to provide a reflective surface, and depth appearing flanges integral with said reflector body, said flanges constituting attaching means.

JOHN R. OISHEI.